Oct. 28, 1941.   E. J. DUNHAM   2,260,804
INDUSTRIAL TRACTOR
Original Filed Aug. 23, 1939   3 Sheets-Sheet 1

Inventor:
Elmer J. Dunham
By Walter E. Schirmer
Atty.

Oct. 28, 1941.  E. J. DUNHAM  2,260,804
INDUSTRIAL TRACTOR
Original Filed Aug. 23, 1939   3 Sheets-Sheet 2

Inventor:
Elmer J. Dunham
By Walter E. Schirmer
Atty.

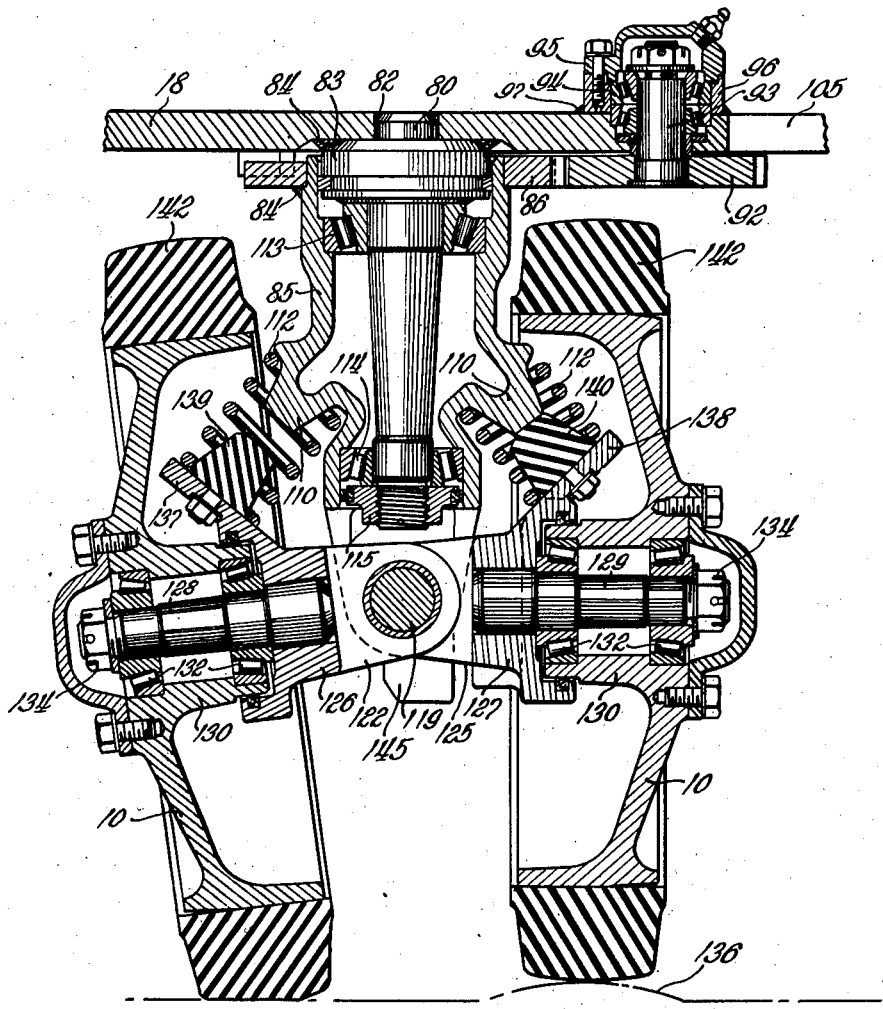

Patented Oct. 28, 1941

2,260,804

UNITED STATES PATENT OFFICE 2,260,804

INDUSTRIAL TRACTOR

Elmer J. Dunham, Battle Creek, Mich., assignor to Clark Equipment Company, Buchanan, Mich., a corporation of Michigan Original application August 23, 1939, Serial No. 291,526. Divided and this application February 23, 1940, Serial No. 320,319

13 Claims. (Cl. 180—57)

This invention relates to industrial tractors, and more particularly is concerned with industrial tractors for use around warehouses, manufacturing and mercantile plants, loading docks, shipyards, and the like where it is desired to transport one or more trailers by means of a power tractor that can draw the trailers from one point to the other, as conditions require.

The present construction contemplat s an entire revision and redesign of industrial tractors of the type shown in the _atent to Robert J. Burrows, No. 1,715,639, issued June 4, 1929, and is a division of the copending application of myself and Wayne Gunning, Serial No. 291,526, filed August 23, 1939.

One of the primary objects of the present invention is to design a shop tractor of this general character which has greatly increased maneuverability, is more streamlined in appearance, and comprises essentially a knee-action type of front wheel suspension facilitating its travel over uneven roadways in combination with a novel design of steering mechanism for facilitating its maneuvering in close quarters.

Still another feature of the present invention is the provision of a body and frame construction which is designed for mass production, and which requires little or no skill in assembling so that the body, in effect, forms the chassis for the vehicle and the power plant and driving mechanisms are secured directly to the body assembly to form a unitary construction. This eliminates expensive assembly operations, and materially reduces the cost of such machines while at the same time retaining the advantages of simplicity and accessibility of maintenance and repair.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 4 is a vertical sectional view through the steering mechanism and front wheel assembly.

Figure 1:
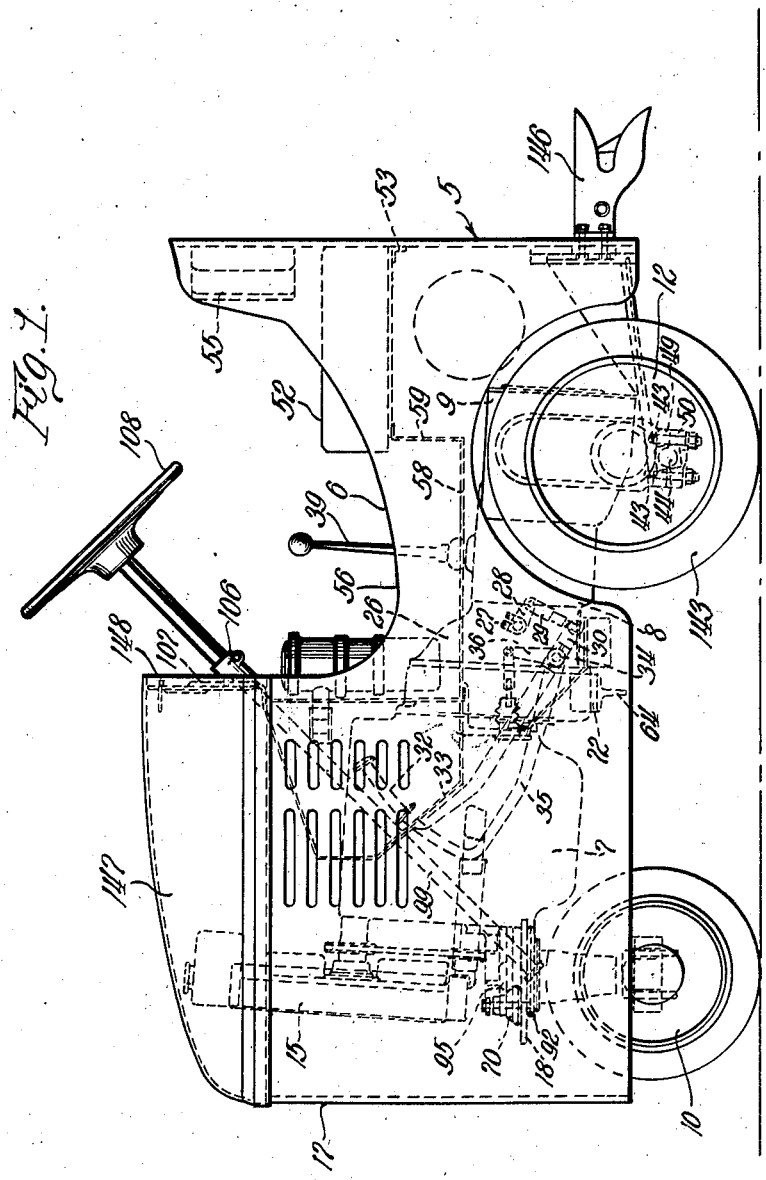
Figure 1 is a side elevational view of an industrial tractor embodying the present invention.

Referring now in detail to the drawings, the tractor is indicated generally at 5 and comprises a frame portion 6, a power plant 7, a transmission 8 and a differential drive axle assembly 9 disposed within the body portion 6.

The forward portion of the vehicle is carried upon the closely spaced front wheels 10, the mounting and control of which is described in detail in the above-mentioned copending application. The rear portion of the vehicle is supported on the driving wheels 12 which are geared to the axle assembly 9 to be driven from the power plant 7.

Figure 2:
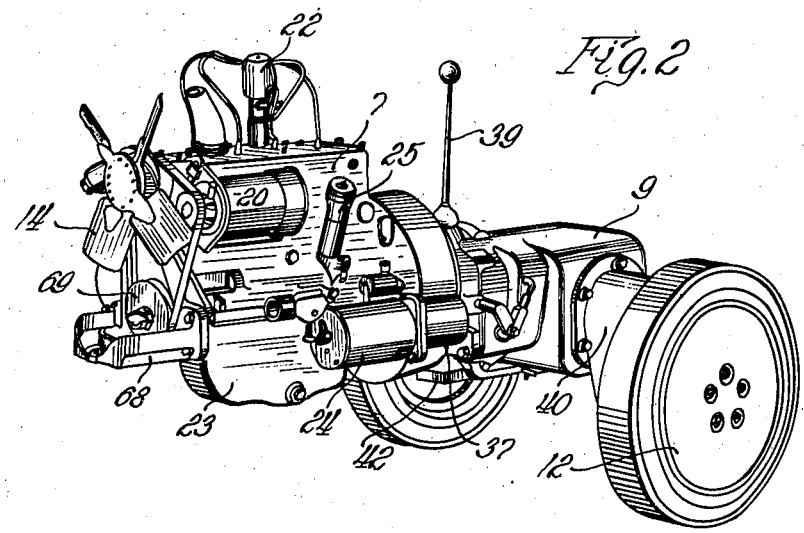
Figure 2 is a perspective view of the power plant and drive axle assembly.
Figure 3:
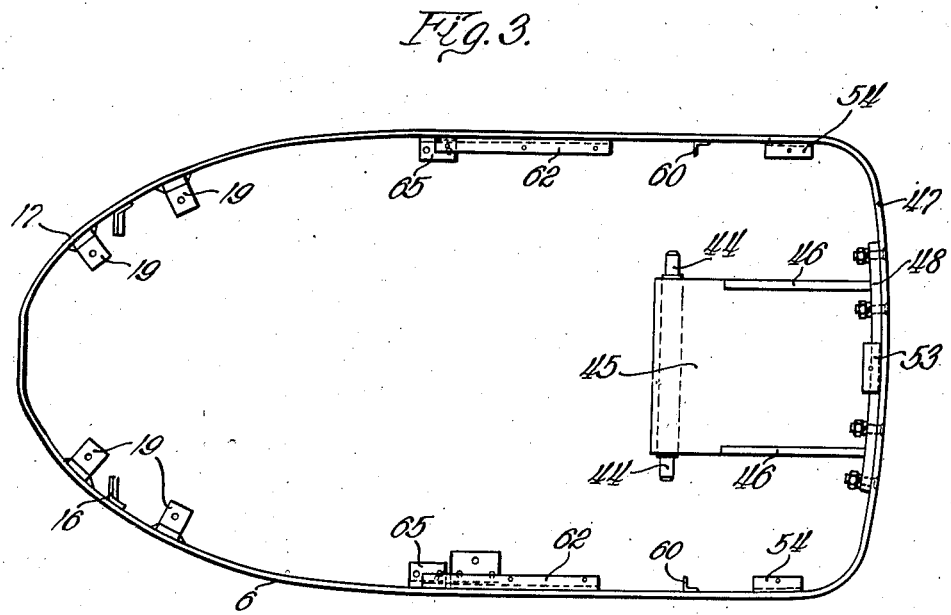
Figure 3 is a plan view of the body frame and mounting arrangement.

Considering now the power plant and drive axle assembly in detail as shown in Figure 2, the engine 7 may be of any conventional internal combustion engine type, and has at the forward end thereof the conventional fan 14 which is disposed directly back of a radiator 15. The radiator 15 is adapted to be mounted within the frame 6 by means of the mounting brackets 16 shown clearly in Figure 3, these brackets being secured to the inner surfaces of the nose portion 17 of the truck above the motor supporting bracket plate 18, shown clearly in Figure 4. The plate 18 is secured to the frame 6 by means of the supporting brackets 19, shown in Figure 3, to which the plate 18 is secured.

The power plant is provided with the conventional auxiliary mechanisms, such as the generator 20, the distributor 22, the crankcase 23, the starter motor 24, and the oil fill tube 25. Bolted to the rear face of the flywheel housing of the engine is the clutch housing 26, shown in dotted lines in Figure 1, having carried thereon the clutch operating shaft 27 which, through the arm 28, link 29 and lever 30, is connected to the clutch pedal 32 disposed on the inclined toe board 33 within the frame of the vehicle. The clutch pedal 32 is mounted for pivotal movement about a stub shaft 34 on which is also mounted the brake pedal 35, which brake pedal through the arm 36 is adapted to actuate the master cylinder 37 of a hydraulic braking system employed on the driving wheels 12.

Bolted to the rear face of the clutch housing 26 is the transmission 8 having the upwardly extending gear shift lever 39 whereby the desired change speed ratios through the transmission can be selected. The driving axle assembly 9 includes a differential having jack shafts extending through the housing arms 40 bolted to the opposite sides of the housing 9 which, at their ends carry suitable pinions engaging internal ring gears in the wheels 12 for transmitting torque thereto in the conventional manner.

Formed on each of the housing arms 40 is a forwardly extending boss portion 42 which is suitably tapped to receive the threaded ends of the studs 43 shown in Figure 1 whereby these boss portions are clamped about the trunnions 44 carried by the axle supporting plate 45 which is welded or otherwise secured by the angle gussets 46 to the rear end 47 of the frame through the plate 48 which is bolted or otherwise secured thereto. The trunnions 44 are formed on the ends of a rectangular shaft which is welded or otherwise secured to the under side of the plate 45, and suitable trunnion engaging caps 49 and 50 are secured by these studs about the trunnions 44 to secure the axle assembly to the plate 45. It will be seen that with this arrangement the entire power plant assembly which is formed as a rigid unit from the power plant to the rear axle may rotate a limited amount about the trunnions 44 during assembly. This insures a positive mounting of the rear axle assembly in the frame.

Disposed above the rear axle assembly 9 is an operator's seat 52 which may be of any conventional form and which is supported by means of the angles 53 welded to the rear frame member 47 and the side angles 54 welded to the sides of the frame adjacent the rear end thereof. A seat back 55 is also provided, and it will be noted that the side wall of the frame is cut away in an arcuate form, as indicated at 56, with its lowermost point adjacent to the connection between the clutch and the transmission to afford easy access to the operator. The floorboards 58 of the tractor are supported at the rear end by the transversely extending Z-shaped member 59, which is secured at its ends to the angle brackets 60 of the frame, and are supported laterally by means of the angles 62 secured to the side walls of the frame. The intermediate portion of the power plant assembly is unsupported on the frame and disposed above the transversely extending T-shaped frame member 64 which extends beneath the flywheel housing, and at its opposite ends is secured to the brackets 65 carried by the side frames of the body 6. In its center the member 64 is formed with an arcuately depressed portion which clears the corresponding lower arcuate portion of the flywheel housing.

The forward end of the power plant is provided with a plate member 68 which is bolted or otherwise secured to the forward end of the engine block, and which is provided with a recessed portion in which the pulley 69 carried at the forward end of the engine crankshaft is received. This plate member is adapted to be secured to the forward cross plate 18, supported on the brackets 19 and extending transversely across the body adjacent the lower portion thereof, by means of suitable rubber motor supports 70 which are secured between the plate 18 and the plate 68. This provides for a resilient mounting of the forward portion of the motor on the body.

Considering now in detail the front wheel suspension, which is shown more clearly in Figure 4, the plate 18 which extends transversely across the body is provided with a stationary spindle 80 which is welded as indicated at 82 to the plate and which has an enlarged collar portion 83 similarly welded to a recess in the bottom face of the plate, as indicated at 84. Rotatably mounted upon the spindle 80 is a tubular steering housing 85 which, at its upper end, is adapted to receive the segment type steering gear 86 centered on the upper shoulder of the housing.

The gear 86 is adapted to be engaged by an idler gear 92 carried upon the spindle 93, which spindle is rotatably mounted within a suitable recess in the plate 18 by means of the double tapered bearing assembly 94 held in position by the bearing cap 95 bolted to the annular retainer collar 96 which is welded or otherwise secured to the upper face of the plate 18, as indicated at 97. This intermediate gear 92 is adapted to be driven from an angularly inclined gear carried at the lower end of a steering shaft 99 which is suitably supported upon the face of the plate 18. The plate 18 is provided with a suitable aperture 105 for receiving the housing assembly at the lower end of the steering shaft, and rotation of the gear (not shown) at the end of this shaft is adapted to rotate the intermediate gear 92 and thence impart rotation to the gear 86, and consequently to the housing 85.

At its upper end the steering shaft 99 passes through the support 106 bolted to the cowl 107 extending in a vertical plane across the opening in the body, and at its upper end is provided with the steering wheel 108 whereby rotation can be imparted thereto.

Referring again to Figure 4, it will be noted that the housing 85 is provided with two opposed downwardly and outwardly extending bosses 110 which are of frusto-conical form, and are adapted to form a seat for the relatively heavy coiled springs 112 extending therefrom. The housing 85 is supported by the tapered bearings 113 and 114 on the spindle 80, the spindle at its lower end being provided with the nut 115 for retaining the lowermost bearing in position. Below the nut 115, the housing 85 is provided with downwardly extending spaced journal portions which form pivotal support for the longitudinally extending shaft 119 mounted in a suitable bushing therein. Mounted on the shaft 119 are the forked ends 122 and 125 of casting members 126 and 127 which carry the steering spindles 128 and 129, respectively. The forked ends 122 and 125 of these members are arranged in alternate relationship on the shaft 119, whereby the shaft 119 carried at the lower end of the steering housing 85 forms the pivotal support for the steering spindle members 126 and 127 respectively. Secured in each of these housings, as by welding or the like, are steering spindle shafts 128 and 129, respectively, each of these shafts extending radially with respect to the shaft 119 and normally in a position inclined slightly downwardly with respect thereto. Mounted on the respective shafts 128 and 129 are the hubs 130 of the forward wheels 10 of the tractor, these hubs being mounted by suitable bearings 132 for rotation about the shafts 128 and 129 and being retained against axial movement by means of the nuts 134 on the ends of each of the shafts.

It will be apparent that the steering spindle housings 126 and 127 are restrained against rotation except about the axis of the shaft 119, and therefore they act to allow the spindles 128 and 129 to move about the shaft 119 as a center in the same vertical plane whereby the wheels 10 can move vertically over obstructions or the like, such as indicated at 136 in Figure 4, in which the right hand wheel is shown in raised position with the left hand wheel in normal position.

Each of the housings 126 and 127 is provided with an upwardly and outwardly extending plate portion 137 and 138, respectively, which plate portions have secured thereto and projecting normally therefrom the rubber bumpers 139 and 140, respectively. Extending about these bumpers are the springs 112 which are seated on the bosses 110 of the steering housing 85. It will therefore be apparent that as the wheel 10 moves upwardly, the plate portion 138 will move toward the boss portion 110 of the steering housing, and will result in compression of the corresponding spring 112. This spring normally is of sufficient strength to hold the wheels in the caster arrangement, whereby they are inclined at a slight angle with respect to each other and with respect to the housing 85. However, if an obstruction is encountered, the springs can be compressed and the wheels can move upwardly to a position in which the rubber bumpers engage the bosses 110 and limit further movement. This provides a quiet cushioning knee action construction for the front steering wheel assembly, and insures a smooth comfortable movement of the tractor without imparting any jolts or jars to the operator.

The wheels 10 are resiliently tired, as indicated at 142, as are also the wheels 12, as indicated at 143. If desired, pneumatic tires may be employed, or soft solid rubber tires can be used in situations which do not require the pneumatic tires. The depending arms of the steering housing 85 are preferably provided with downward extensions 145 which limit the possible raising movement imparted by the springs 112 to the vehicle when the wheels are resting on the ground to prevent any possibility of a wheel being moved by these springs downwardly into a position in which it would become inoperative.

It will be apparent from this description that I have provided a very simple type of construction in which the tractor body forms the supporting chassis for the power plant and drive axle assembly, and no auxiliary chassis is necessary. The body is also shaped so as to allow close maneuvering, being limited in width to the tread of the wheels 12 and having a relatively stiff nose portion 17 which can be used for bumping purposes or pushing purposes, the tractor preferably being provided with the coupling mechanism 146 on the rear wall 47 so that trailers or the like may be coupled thereto for towing purposes. The rear wall 47 of the tractor body extends sufficiently high so as to protect the operator from possible injury, and extending over the forward portion of the body is a curved hood 147 which is preferably hinged at its rear end, as indicated at 148, so that it may be raised for inspection of the engine and for servicing the same with water and oil.

I am aware that various changes may be made in certain details of construction of the present invention without departing from the underlying principles thereof, and I therefore do not intend to be limited except as defined by the scope and spirit of the appended claims.

I claim:

1. In an industrial tractor, a continuous one-piece body member laterally enclosing the tractor, a power plant assembly including an engine, clutch, transmission and drive axle coupled together as a rigid unit, means for rotatably supporting the axle end of said unit on the rear wall of said body member, a transverse plate across the forward end of said member, and means resiliently supporting the forward end of said engine on said plate.

2. A body member for an industrial truck of the class described comprising a continuous vertically extending panel tapering forwardly into a rounded nose portion and having an arcuate rear wall portion, the side walls of said body member being cut downwardly from the rear wall to adjacent the center thereof to provide access into the body member and terminating forwardly in vertically rising edges defining the ends of an instrument panel, and a forwardly and downwardly inclined plate secured to the rear wall adjacent the lower end thereof and terminating forwardly in laterally extending axle housing supporting trunnions.

3. The body member of claim 2 further characterized in the provision of a transverse plate secured in the nose portion thereof having a depending stud and forming a combined steering wheel and power plant support.

4. In combination, in an industrial tractor, a unitary assembly comprising a power plant, transmission and drive axle assembly rigidly coupled together, a generally oval shaped body member enclosing said assembly and including a forwardly tapering nose portion, means extending forwardly from the rear wall of said body member including lateral trunnion supports for said drive axle assembly, and means in the nose portion of said body member resiliently supporting the forward end of said power plant for limited vertical movement, said unitary assembly pivoting about said trunnion supports to accommodate such movement.

5. The combination of claim 4 wherein said trunnion support means comprises a forwardly and downwardly inclined plate having laterally directed trunnions at the forward edge thereof, and means clamping said axle assembly about said trunnions.

6. The combination of claim 4 wherein said means in the nose portion of said body member comprises a transverse plate rigidly secured to said body member and a rubber cushioned support between said power plant and said plate.

7. In combination, in an industrial tractor, a rigid assembly comprising a power plant, a transmission and a driving axle, a body member enclosing said assembly laterally, means mounting the forward end of said power plant for relative vertical movement in one end of said body member, and means pivotally mounting the axle end of the assembly in the opposite end of said body member.

8. In combination, in an industrial tractor, a power plant assembly including an engine, transmission and drive axle coupled together as a rigid unit, a pair of driving wheels connected to said axle, a body enclosing said assembly and having trunnion means supporting the rear end of said body from said axle, an operator's seat carried by said body above said axle, a transverse plate across the forward end of said body, and means resiliently supporting the forward end of said power plant on said plate.

9. In combination, in an industrial tractor, a power drive assembly including an engine, transmission and drive axle housing coupled together as a rigid unit, a body laterally enclosing said assembly, means pivotally supporting said axle housing within the rear end of said body, drive wheels spaced laterally outwardly of said supporting means in the plane of the side walls of said body, means resiliently supporting the forward end of the power plant in the forward nose of said body and allowing limited relative vertical movement therebetween, and steering means secured to said last-named means below the power plant support.

10. An industrial tractor comprising a power plant assembly including longitudinally spaced engine and driving axle connected as a rigid unit, a generally ovate shaped body laterally enclosing said unit and having a dirigible wheel assembly depending from one end thereof, means resiliently supporting said engine for relative vertical movement within said end of said body, and means journalling the opposite end of said body for vertical swinging movement relative to said driving axle.

11. An industrial tractor comprising a rigid power unit and driving assembly, a body of generally ovate shape laterally enclosing said assembly and having a transverse plate at one end thereof, means resiliently supporting one end of said assembly for vertical movement relative to said plate, and means rotatably journaling said body for movement in a vertical plane on the opposite end of said assembly.

12. The tractor of claim 11 further characterized in the provision of a wheeled support for said one end of said assembly depending from said plate, and a depending stud secured to said plate and forming a vertical journal for said wheeled support.

13. In combination, in an industrial tractor, a power drive assembly including an engine, transmission and drive axle housing coupled together as a rigid unit, a body defined by vertical walls laterally enclosing said assembly, means pivotally mounting said axle housing within the rear end of said body, an operator's seat carried by said body substantially above said axle housing, the side walls of said body being cut away to provide easy access to said seat, means resiliently supporting the forward end of the power plant in the forward nose of the body, and a hood enclosing the top of the forward portion of said body and hinged for vertical movement at the forward ends of said cut out portions.

ELMER J. DUNHAM.